(12) United States Patent
Adcock et al.

(10) Patent No.: US 8,557,454 B2
(45) Date of Patent: Oct. 15, 2013

(54) FUEL CELL SYSTEM AND REVERSE FLOW RELIEF VALVE

(75) Inventors: Paul Adcock, Leicestershire (GB); Peter David Hood, Leicester (GB); Scott Baird, Nottingham (GB)

(73) Assignee: Intelligent Energy, Ltd., Loughborough (GB)

( * ) Notice: Subject to any disclaimer, the term of this patent is extended or adjusted under 35 U.S.C. 154(b) by 552 days.

(21) Appl. No.: 12/680,511

(22) PCT Filed: Sep. 25, 2008

(86) PCT No.: PCT/GB2008/003256
§ 371 (c)(1),
(2), (4) Date: Oct. 12, 2010

(87) PCT Pub. No.: WO2009/040535
PCT Pub. Date: Apr. 2, 2009

(65) Prior Publication Data
US 2011/0033763 A1    Feb. 10, 2011

(30) Foreign Application Priority Data
Sep. 26, 2007 (GB) .................................... 0718761

(51) Int. Cl.
*H01M 8/06*    (2006.01)

(52) U.S. Cl.
USPC ........... 429/414; 429/413; 429/428; 429/450; 137/469; 137/470; 137/472; 137/496

(58) Field of Classification Search
USPC .......... 429/413, 414, 428, 450; 137/469, 470, 137/472, 496
See application file for complete search history.

(56) References Cited

U.S. PATENT DOCUMENTS

| | | | | |
|---|---|---|---|---|
| 3,134,394 | A | * | 5/1964 | Ohta ............................. 137/220 |
| 4,478,236 | A | * | 10/1984 | Neuzeret et al. ............. 137/107 |
| 5,090,659 | A | * | 2/1992 | Bronnert ...................... 251/61.1 |
| 2005/0112431 | A1 | * | 5/2005 | Hamada et al. ................. 429/26 |

FOREIGN PATENT DOCUMENTS

JP          2003317754 A    * 11/2003

* cited by examiner

*Primary Examiner* — Zachary Best
(74) *Attorney, Agent, or Firm* — Baker Hostetler, LLP

(57) ABSTRACT

A method of shutting down operation of a fuel cell system comprising a fuel cell stack, the method comprising the sequential steps of: i) ceasing a supply of fuel to the fuel cell stack; ii) closing a shut-off valve on an exhaust line in fluid communication with a cathode system of the fuel cell system, the cathode system comprising a cathode fluid flow path passing through the fuel cell stack; iii) pressurising the cathode system with an air compressor in fluid communication with a cathode air inlet port in the fuel cell stack; and iv) ejecting water from the cathode flow path.

5 Claims, 5 Drawing Sheets

Purge operation

Water delivery operation

FUEL CELL SYSTEM AND REVERSE FLOW RELIEF VALVE

This application is a national stage filing under 35 U.S.C. 371 of International Application PCT/GB2008/003256, filed on 25 Sep. 2008, (Published on 2 Apr. 2009 as WO/2009/040535), which claims priority from GB Application No. 0718761.0, filed 26 Sep. 2007, the entirety of each being incorporated herein by reference, as if fully set forth herein.

FIELD OF THE DISCLOSURE

The disclosure relates to the operation of, and apparatus relating to, a fuel cell system, and in particular though not exclusively to a strategy for shutting down a fuel cell system.

BACKGROUND

Water is integral to the operation of a fuel cell system, for example in the form of the system described herein comprising a fuel cell stack based around a proton exchange membrane (PEM). Reaction of protons (hydrogen ions) conducted through the PEM from an anode flow path, with oxygen present in a cathode flow path, produces water. Excess water needs to be removed from the fuel cell stack to avoid flooding and causing a consequent deterioration in performance. An amount of water, however, needs to be present in at least the cathode flow path to maintain hydration of the PEM, so as to achieve optimum performance of the fuel cell. Managing this water, by deliberate injection and removal, can also provide a useful mechanism for removing excess heat from the fuel cell stack.

To optimize performance, water can be employed deliberately in such fuel cell systems through injection into the cathode flow path of the stack. Such water injection fuel cell systems have potential advantages of reduced size and complexity, as compared with other types of fuel cell systems employing separate cooling channels. Water may be injected directly into the cathode flow path through water distribution manifolds, as for example described in GB2409763.

For water injection systems, it is important that any water fed back into the cathode flow path is of high purity, so as to avoid contamination of the PEM and consequent degradation of stack performance. This requirement for high purity, however, means that additives to lower the freezing point of water cannot be used. For automotive applications in particular, typical requirements include starting up from below freezing, typically as low as −20° C. to replicate environments in which the fuel cell may be used in practice. Since high purity water has a freezing point of 0° C. (at 1 bar pressure), any water left in the fuel cell system will, given sufficient time, freeze after shut-down of the fuel cell.

Ice in the fuel cell system, and in particular within the cathode flow path, can prevent the stack from operating properly, or even at all. If any part of the cathode flow path is blocked with ice, air cannot be passed through the cathode and the fuel cell may not be capable of self-heating to above freezing point. Other methods of heating the whole stack will then be necessary, which will require consumption of external power before the fuel cell can begin supplying electrical power and heat by itself.

A purging operation can be used on shut-down of a fuel cell stack, such as that described in U.S. Pat. No. 6,479,177. This document discloses a fuel cell stack having water cooling passages separate from the cathode flow path. A pressurised dry nitrogen feed is used to purge water from the stack before allowing the temperature of the stack to fall below freezing. This method, however, requires a supply of pressurised nitrogen, which might not be available or even desirable in an automotive environment.

SUMMARY

In a first aspect, the disclosure provides a method of shutting down operation of a fuel cell system comprising a fuel cell stack, the method comprising the sequential steps of:
i) ceasing a supply of fuel to the fuel cell stack;
ii) closing a shut-off valve on an exhaust line in fluid communication with a cathode system of the fuel cell system, the cathode system comprising a cathode fluid flow path passing through the fuel cell stack;
iii) pressurising the cathode system with an air compressor in fluid communication with a cathode air inlet port in the fuel cell stack; and
iv) ejecting water from the cathode flow path.

In a second aspect, the disclosure provides a fuel cell system comprising:
a fuel cell stack;
a cathode system having a cathode fluid flow path comprising a cathode air inlet line, a cathode volume within the fuel cell stack and a cathode exit line connected in series and configured to allow passage of air through the fuel cell stack;
an air compressor in fluid communication with the cathode air inlet line;
a thermally insulated containment vessel configured to receive water through a water return line from the cathode flow path,
wherein the fuel cell system is configured to eject water from the cathode flow path into the containment vessel through the water return line upon shutting down operation of the system.

In a third aspect, the disclosure provides a reverse flow relief valve comprising:
a first feed port;
a second feed port;
a non-return valve within a main fluid passage extending between the first and second feed ports, the non-return valve configured to allow fluid to pass from the first to the second feed ports and to block passage of fluid in the reverse direction;
a bypass fluid passage in fluid communication with the main fluid passage;
a sealing valve biased against an end of the bypass passage between the bypass passage and a purge port,
wherein the sealing valve is configured to maintain a seal against the bypass passage when fluid pressure in the first feed port exceeds fluid pressure at the second feed port to prevent fluid flow from the main fluid passage to the purge port through the bypass fluid passage, and to allow fluid flow from the second feed port to the purge port through the bypass fluid passage when fluid pressure at the second feed port exceeds fluid pressure at the first feed port.

In a fourth aspect, the disclosure provides a fuel cell system comprising:
a fuel cell stack;
a cathode system having a cathode fluid flow path comprising a cathode air inlet line, a cathode volume within the fuel cell stack and a cathode exit line connected in series and configured to allow passage of air through the fuel cell stack;
a heat exchanger connected in series with a water separator to the cathode exit line of the cathode fluid flow path, wherein a water ejection outlet line of the water separator is connected to a water containment vessel by a first water return line.

DRAWINGS

The disclosure will now be described by way of example only, and with reference to the appended drawings in which.

Other features and advantages of the present disclosure will be set forth, in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure.

ADDITIONAL DESCRIPTION

In the following description, various exemplary implementations, aspects and characteristics are discussed as directed toward surgical instruments, tools, systems and methods more particularly applied to the spine. The focus on this application is not intended to be, nor should it act as, a limitation to the scope of this disclosure. The other features and advantages of the resent disclosure will be set forth in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure.

Heading and Titles are not intended to be limitations and should be read in a general sense. Implementations may include several novel features, no single one of which is solely responsible for its desirable attributes or which is essential to practicing the disclosure described herein. The advantages of the present disclosure may be attained by means of the instrumentalities and combinations particularly pointed out in the disclosure and any appended claims.

Figure 1:
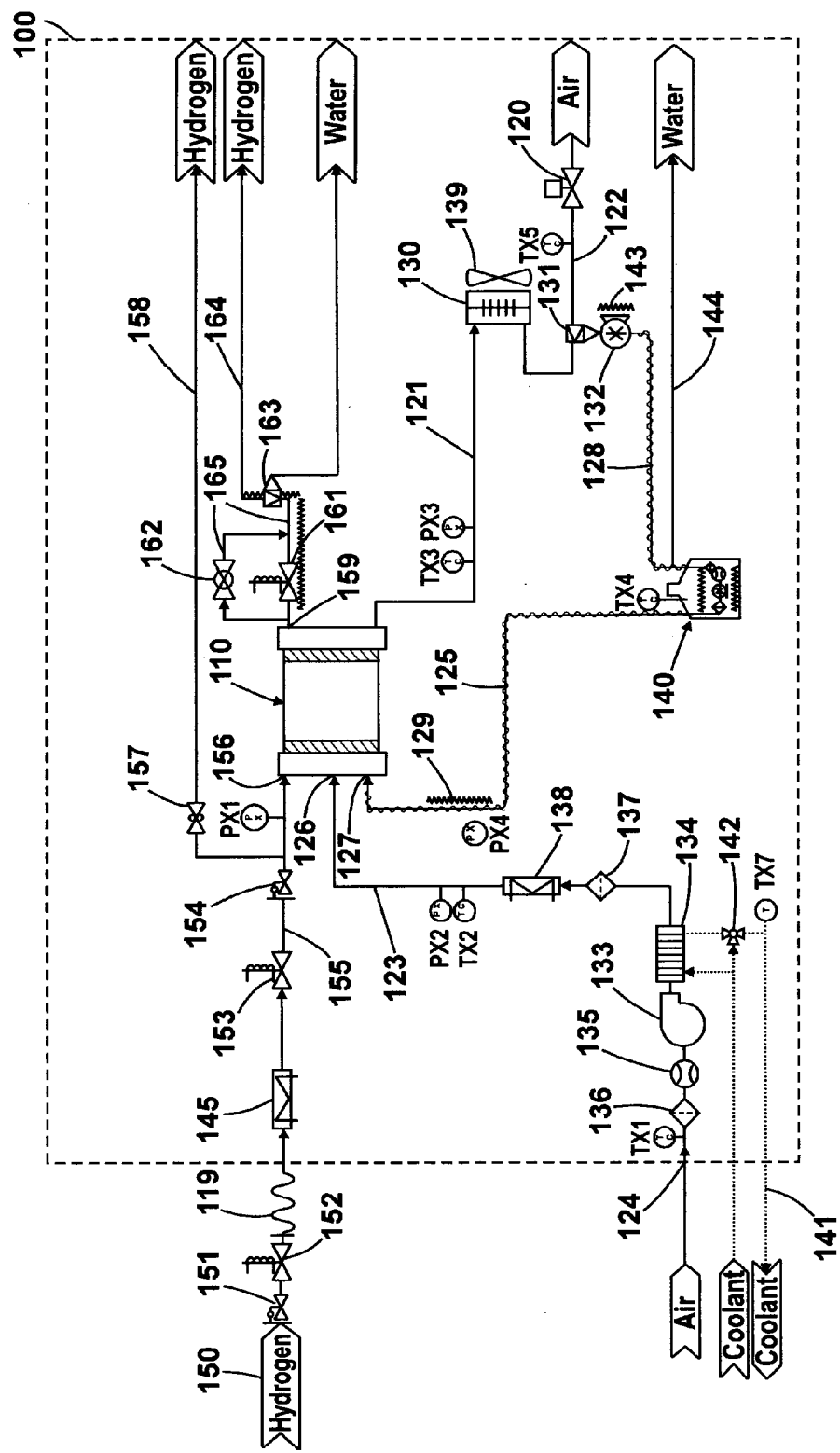
FIG. 1 illustrates a schematic diagram of the arrangement of various components within an overall fuel cell system.

FIG. 1 shows a schematic diagram of an exemplary fuel cell system 100 comprising a fuel cell stack 110 and other associated components. The fuel cell stack 110 has a cathode flow path passing through it, the cathode flow path comprising an air inlet 124 leading to an air inlet line 123 and into the stack at the cathode air inlet 126. After passing through an internal cathode volume (not shown) within the fuel cell stack 110, the cathode flow path exits the fuel cell stack 110 into the cathode exit line 121, through the cathode exhaust line 122 and an exhaust shut-off valve 120. During normal operation, the exhaust shut-off valve 120 is partially or fully open. Various components such as a heat exchanger 130, with associated cooling fan 139, and a water separator 131 may be connected to or part of the cathode exit line 121 and exhaust line 122 in the cathode flow path. Temperature sensors TX1, TX2, TX3, TX5 and pressure sensors PX2, PX3 may also be present, connected at appropriate places to monitor the inlet line 123 and exit line 121 of the cathode flow path.

The expression 'cathode system' in the present context is intended to encompass those parts of the fuel cell system 100 that are associated with the cathode volume within the fuel cell stack. These include the various internal components of the fuel cell such as the inlets, outlets, the internal flow path and water distribution structures, as well as components in fluid communication with the cathode volume such as the various inlet, outlet, recirculation and exhaust lines for both liquids and gases. The term 'cathode flow path' is intended to encompass a subset of the cathode system that includes a fluid flow path from the air inlet 124 through an air compressor 133, the inlet line 123, the cathode volume of the fuel cell stack 110, and the cathode exit line 121. The terms 'anode system' and 'anode flow path' are to be interpreted similarly, with reference to the various components of the fuel cell system 100 associated with the anode volume.

The air compressor 133, connected to the cathode air inlet line 123, provides compressed air to the cathode flow path. Other components such as an air inlet heat exchanger 134, a flow meter 135, one or more air filters 136, 137 and an air heater 138 may be present in the cathode inlet line 123 between the air inlet 124 and the fuel cell stack 110. The air inlet heat exchanger 134 may be used in conjunction with a coolant line 141, a three-way valve 142 and a temperature sensor TX7 to pre-heat air from the air compressor 133 with coolant from the coolant line 141 during operation of the fuel cell system 100. The coolant line 141 passing through the air inlet heat exchanger 134 forms a separate cooling circuit configured to extract heat from the air stream after the compressor 133. This coolant line 141 is preferably operated after the fuel cell stack 110 reaches a normal operating temperature, in order to avoid extracting heat from the air inlet stream in the cathode air inlet line 123 during start-up of the system 100. Diversion of coolant in the line 141 may be achieved through use of the valve 142, allowing control over whether coolant is delivered to the heat exchanger 134. Since the coolant line 141 is separate from water fed into the cathode system, the requirement for high purity water is not the same. The coolant used in the coolant line 141 may therefore comprise additives such as glycol to lower the freezing point of the coolant used.

Fuel, typically in the form of gaseous hydrogen, enters the fuel cell system via a pressure-reducing valve 151 and an actuated valve 152, preferably in the form of a normally-closed solenoid-actuated valve. The fuel supply 150, when in the form of hydrogen gas, is typically located remotely from the fuel cell system, for example in the form of a pressurised tank towards the rear of a vehicle. A further solenoid-actuated valve 153 and a pressure-reducing valve 154 may be provided closer to the fuel cell stack 110 in the fuel inlet line 155 of the anode flow path between the fuel source 150 and the anode inlet 156 of the fuel cell stack 110. Two separate sets of valves are therefore provided leading to the anode inlet 156, one set 151, 152 near to the tank and the other set 153, 154 closer to the fuel cell stack 110, with an intermediate pressurised fuel line 119 in between. The pressure-reducing valve 154 regulates the pressure of the dry fuel gas to a level suitable for introduction to the fuel cell stack 110. The pressure-reducing valve 154 is preferably a passive device which has a preset pressure setting applied, although an actively controlled device may be used. A fuel heater 145 is optionally provided, for example in the pressurised fuel line 119 before the valve 153, as shown in FIG. 1, or alternatively in the fuel inlet line 155 either before or after the pressure-reducing valve 154.

A further actuated valve 161 is provided on the anode exit line 165. Each actuated valve 152, 153, 161 may be provided with a local heater element to defrost the valve as required, although activation of the valves 152, 153, 161 through passage of current through the solenoid will provide a certain degree of heating. Preferably each of the actuated valves 152, 153, 161 is configured to be fail-safe, i.e. will only open when actuated by current passing though the solenoid.

To monitor and to relieve pressure of fuel within the anode flow path, a pressure sensor PX1 and/or pressure relief valve 157 may be provided. The pressure relief valve 157 is preferably set to open and exhaust fluid from the anode flow path through a pressure relief exhaust line 158 when the pressure in the anode flow path exceeds a safe operating level.

A further manually operable valve 162 in the anode exit line 165 may be present, this valve 162 being for used for example during servicing to ensure depressurisation of the anode flow path. Water build-up in the anode flow path in the fuel cell stack 110 may occur, for example as a result of diffusion of water through the PEM from the cathode side. Consequently, an anode exhaust water separator 163 may be provided in the anode exhaust line 164 to separate any water present in the exhaust line 164. This water can be exhausted or optionally recirculated. During operation of the fuel cell stack 110, the valve 161 is typically held closed, and only opened intermittently to exhaust any built-up water from the anode fluid path.

A cathode water injection inlet 127 is provided in the fuel cell stack 110, the inlet 127 connected to a cathode water injection line 125. The cathode water injection line 125 may be heated along a part or the whole of its length, and extends between a water containment vessel 140 and the cathode water injection inlet 127. A heater 129 may be provided to apply heat to a specific region of the line 125 to heat water passing through the injection line 125 towards the cathode water injection inlet 127. A further pressure sensor PX4 may be provided on the cathode water injection line 125 in order to monitor the back-pressure on the line 125 during operation.

Water from the cathode exit line 121 is pumped with a water pump 132, optionally provided with a heater 143, through a water return line 128 towards the water containment vessel 140, further details of which are provided below with reference to FIG. 2. Excess water is ejected from the fuel cell system 100 out of the water containment vessel 140 through a water overflow line 144.

Figure 2:
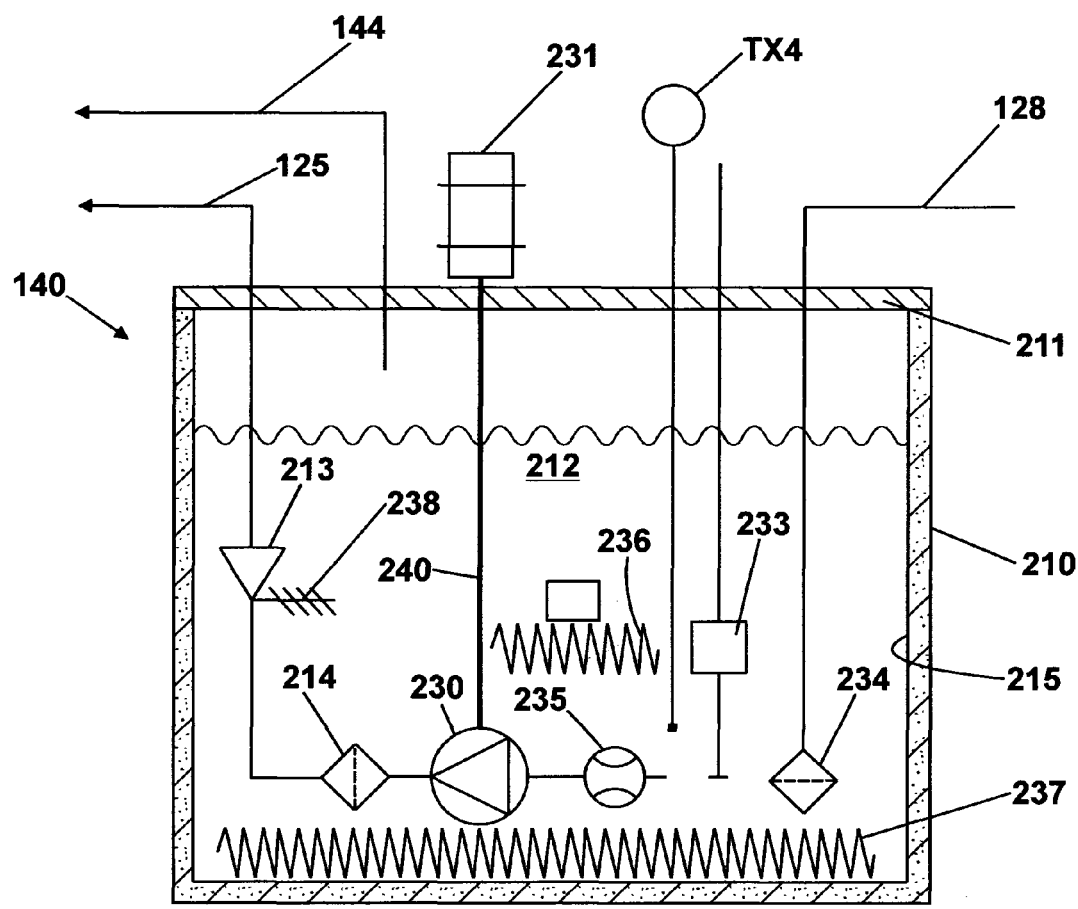
FIG. 2 illustrates a schematic diagram of an exemplary water containment vessel.

Shown in FIG. 2 is a schematic cross-sectional view of the water containment vessel 140 of FIG. 1. The vessel 140 comprises a thermally insulating wall 210 and a lid 211, which may also be thermally insulated. Preferably the wall 210 of the vessel 140 is of a double wall construction, having a vacuum or other thermally insulating layer such as air or expanded polystyrene between the two walls. The inner surface 215 of the vessel 210 is preferably made from a material having a resistance to corrosion, such as stainless steel, to prevent contamination of water 212 within the vessel.

The purpose of the lid 211 is to allow connections to the various elements housed within the vessel 140, whilst also maintaining a good degree of insulation. Typically the lid 211 is manufactured from glass-reinforced nylon with an additional layer of insulating foam. Ports in the lid to accommodate passage of the lines 125, 144, 128 are preferably configured such that when the system is shutdown, any residual water runs back into the vessel. This involves using pipe of a suitably large diameter such that beads of water do not form to span the internal bore of the pipe and hang up in the line. Preferably, no fittings are used in the lid so that pipes passing through the lid 211 contain no sharp bends. In a general aspect, therefore, the water injection line 125 extending between the water containment vessel 140 and the cathode water injection inlet 127, and an exhaust line 121, 128 extending between a cathode exit line 121 and the water containment vessel 140 both comprise piping having an internal bore such that beads of water do not span the bore after ejection of water from the cathode system.

A thermostatic heating element 236 within the vessel 140 is provided to maintain the temperature of water 212 within the vessel 140 above freezing point. A level sensor 233 provides a signal indicating the level of water 212 within the vessel. A heater 237 is provided in addition to the thermostatic heating element 236 in order to provide faster heating to defrost the water 212 if frozen. Due to the energy requirement of changing the phase of water from solid to liquid, this heater 237 is typically of a higher power rating than the thermostatic heating element 236, for example around 180 W or higher. The thermostatic heater 236 is configured to ensure that the temperature of the water 212 in the vessel 140 remains above a set point. This set point is typically 5° C., in order to prevent the water from freezing. The thermostatic heater 236 may be powered by a 12V battery supply, and set to operate for a prescribed period. Hence, during this period, liquid water in the vessel can be guaranteed. For longer periods at sub-zero ambient temperature, the thermostatic heater 236 is disabled to save on battery power. The water 212 may then freeze, and will require defrosting with the higher power heater 237. The thermostatic heater is typically of a power rating such that a maximum heat output is slightly larger than the maximum rated losses from the vessel. A typical power rating is in the range of 2 to 4 W.

A temperature sensor TX4, preferably comprising a submerged thermistor, is installed in order to allow the temperature of the water 212 in the vessel 140 to be monitored.

An overflow line 144 is provided to eject excess water from the containment vessel if a level of water in the vessel exceeds a preset amount.

Water from the water return line 128 enters the vessel 140 through a filter 234. A pump 230, 231, 240 pumps the water 212 from the vessel 140 through a further filter 214, a reverse flow relief valve 213 and into the cathode water injection line 125. A flow meter 235 is configured to monitor the amount of water passing through the cathode water injection line 125.

The pump is preferably constructed such that a motor portion 231 is located outside the containment volume of the vessel 140 and therefore avoids being in contact directly with water 212 within the vessel. A shaft 240 between the motor 231 and a pump head 230 allows the motor 231 to drive the pump head 230. The pump head, comprising at least the inlet, outlet and impeller, is preferably of a construction such that, after being submerged in frozen water the pump is able to operate again once the water is defrosted. The motor 231 is preferably rated for operation at sub-zero temperatures.

The pump head 230 is located so as to be submerged by water 212 in the vessel 140. This has the advantage of there being no requirement for the pump head 230 to be purged during shutdown or heated during startup, particularly when water 212 is maintained within the flask after shutdown. The pump head 230 is preferably configured to have a small thermal mass. Thawing of any ice within the pump head 230 is achieved via heat transferred from the surrounding water as it defrosts. The pump head 230 is also preferably configured to accommodate expansion due to ice formation. On thawing, the pump head 230 then returns to its original shape without compromising its operation.

The reverse flow relief valve 213 is constructed such that water is allowed to pass from the pump head 230 through the cathode water injection line 125 towards the cathode water injection inlet 127 when the pump is operational, creating a pressure drop across the valve in the direction of flow. However, when the pump is stopped and pressure in the cathode water injection line 125 is increased, the valve 213 allows water to flow back into the vessel 140 through a purge port 238.

The purpose of the reverse flow relief valve 213 is to allow water to be back flushed into the vessel 140 from the fuel cell stack 110 and connecting lines during shutdown of the system 100. Closing the cathode exhaust valve 120 allows water in the fuel cell stack 110 to be forced under pressure from the air compressor 133 back through the cathode water injection inlet 127, out of the stack 110 and through the water injection line 125 towards the water containment vessel 140. However, if a gear pump is used in the containment vessel, without the reverse flow relief valve 213 no water would flow due to the pressure required to push water back through the pump head 230. Therefore, the reverse flow relief valve 213 is configured such that in normal operation it allows water to pass through it from the pump to the fuel cell stack 110. When subjected to a small back pressure (for example in the region of 300 mBar·g) when the pump head 230 is not being operated, a diaphragm opens and allows water to flow back into the flask through the purge port 238.

Figure 3:
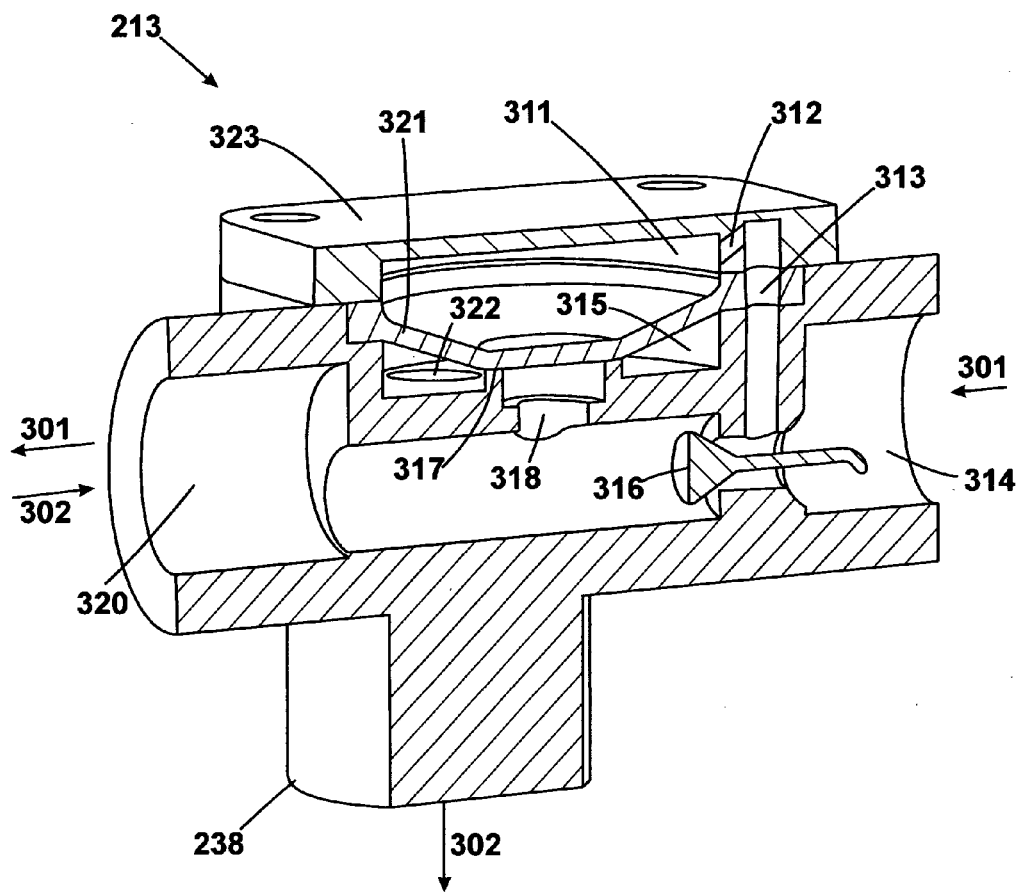
FIG. 3 illustrates a cutaway perspective view of an exemplary reverse flow relief valve.

An exemplary embodiment of the reverse flow relief valve 213 is shown in FIG. 3 in cutaway form. In normal operation, water flows from the containment vessel 140 through the reverse flow relief valve 213 in the directions indicated by arrows 301. Water flows through a first feed port 314, through a non-return valve 316 and out of the valve 213 through a second feed port 320 towards the cathode water injection line 125. The pressure of water in the first feed port 314 is transmitted via a connecting passage 313 and transfer passage 312 to a cavity 311 sealed by a sealing valve, for example in the form of a diaphragm 321, and enclosed by a cover face 323. The pressure maintains a sealing face 317 of the diaphragm 321 against a face of a bypass passage 318, and thus prevents fluid from passing between the second feed port 320 and a low pressure cavity 315 behind the diaphragm 321.

Once the water containment vessel pump 230 is disabled, a loss of pressure in the first feed port 314 and an increase in pressure in the second feed port 320 caused by an increased pressure in the cathode volume of the fuel cell stack 110 causes the non-return valve 316 to close. The increased pressure in the second feed port causes the diaphragm 321, which is preferably composed of a resilient material such as a rubber, to flex and open up a passage between the bypass passage 318 and the low pressure cavity 315. Water is then allowed to flow from the second feed port 320 through the bypass passage 318, into the low pressure cavity 315, through a purge passage 322 and out of the valve 213 through the purge port 238. The overall direction of flow in the reverse direction is indicated by arrows 302.

The configuration of the reverse flow relief valve allows water to be ejected from the cathode volume in the fuel cell stack and the cathode water injection line while allowing the pump head 230 in the containment vessel 140 to remain primed with water. Provided the water 212 in the vessel is not frozen, the pump head 230 then remains in a state ready to immediately begin pumping water for injection into the cathode volume of the fuel cell stack 110.

Figure 4A:
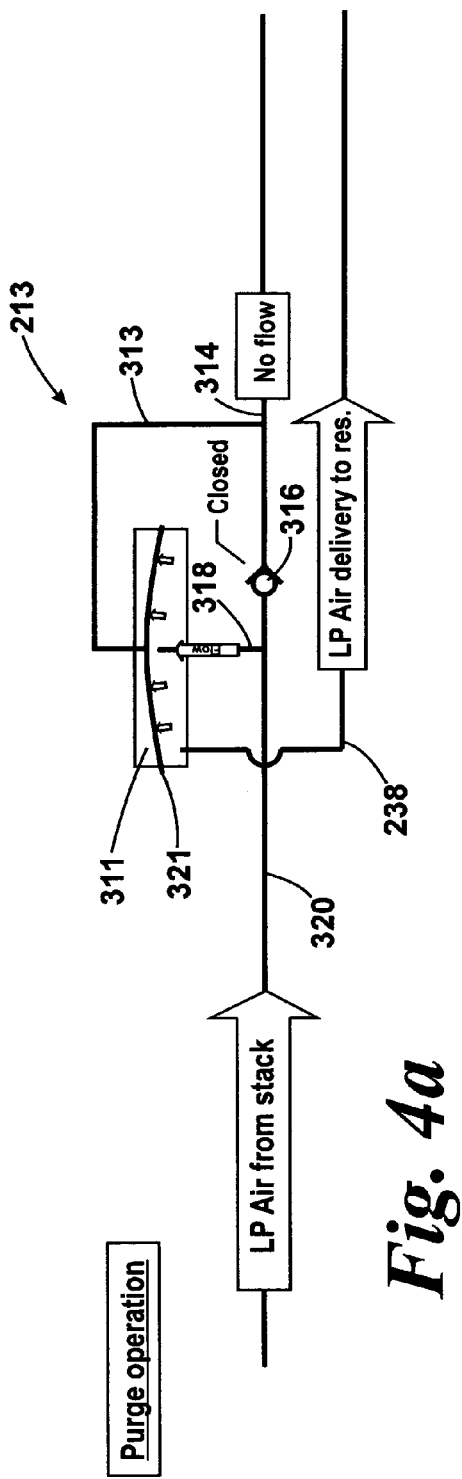
FIGS. 4a and 4b illustrate schematically the operation of the reverse flow relief valve of FIG. 3.
Figure 4B:
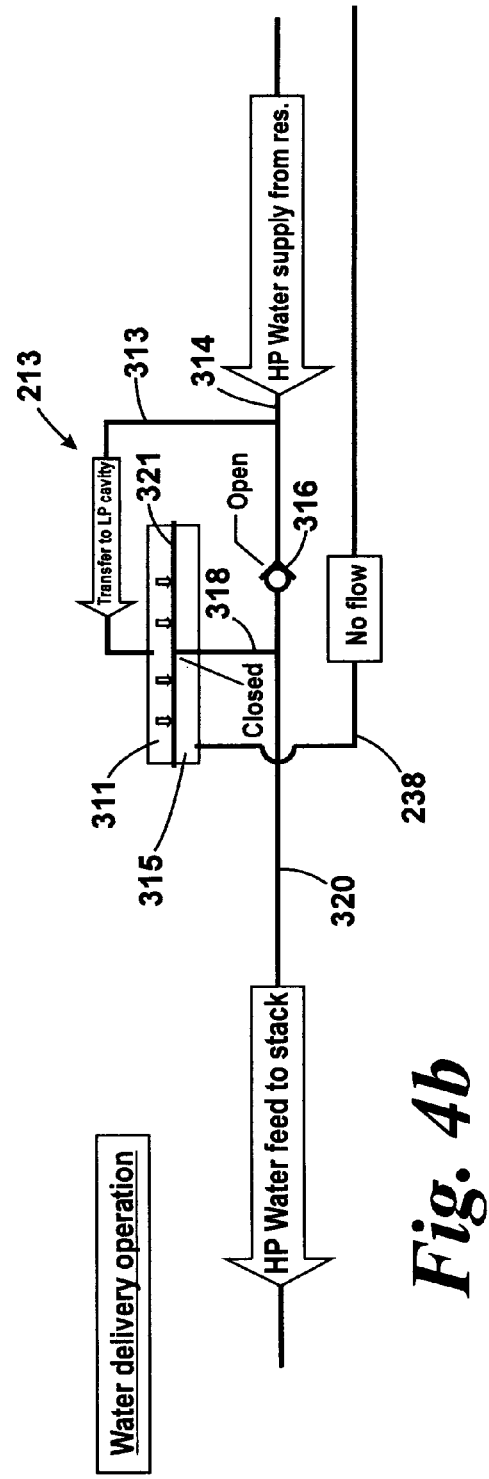

FIGS. 4a and 4b show schematically the two different modes of operation possible with the reverse flow relief valve 213. In FIG. 4a, the purge operation is shown, in which low pressure air from the fuel cell stack enters the valve 213 through the second feed port 320, and there is no flow into the first feed port 314. This low pressure air causes the diaphragm 321 to deflect and allow flow through the bypass passage 318 and out of the valve through the purge port 238 for delivery to the water reservoir in the water containment vessel 140. The non-return valve 316 prevents flow through to the first feed port 314.

In FIG. 4b, the water delivery operation of the reverse flow relief valve 213 is shown, in which high pressure water pumped from the reservoir in the water containment vessel 140 enters the valve 213 through the first feed port 314. The pressure, transmitted via the connecting passage 313 to the high pressure cavity 311, maintains the diaphragm 321 in a closed position against the bypass passage 318. Flow of water passes through the non-return valve 316 and out of the reverse flow relief valve 213 via the second feed port 320. No flow occurs through the purge port 238.

Figure 5A:
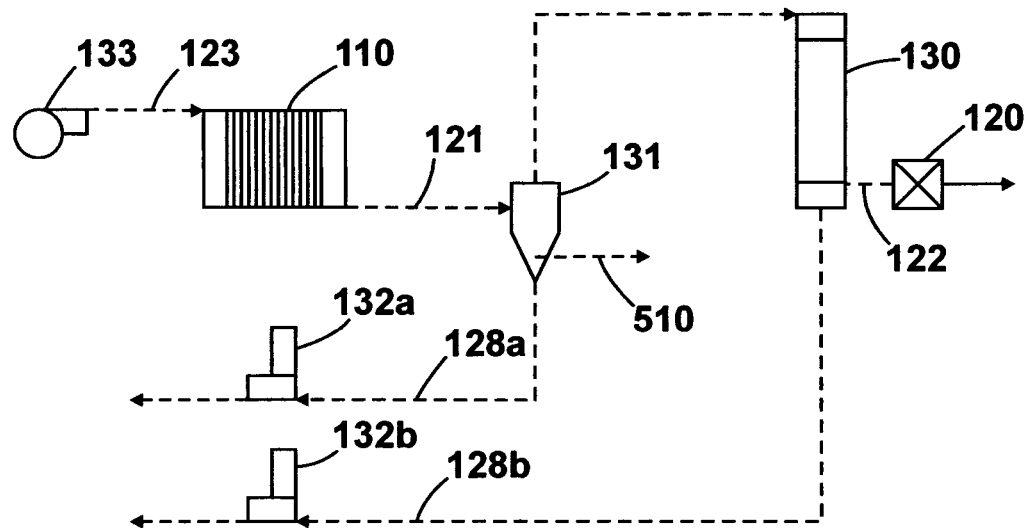
FIGS. 5a and 5b illustrate schematically two alternative configurations for cathode exit stream liquid separation.
Figure 5B:
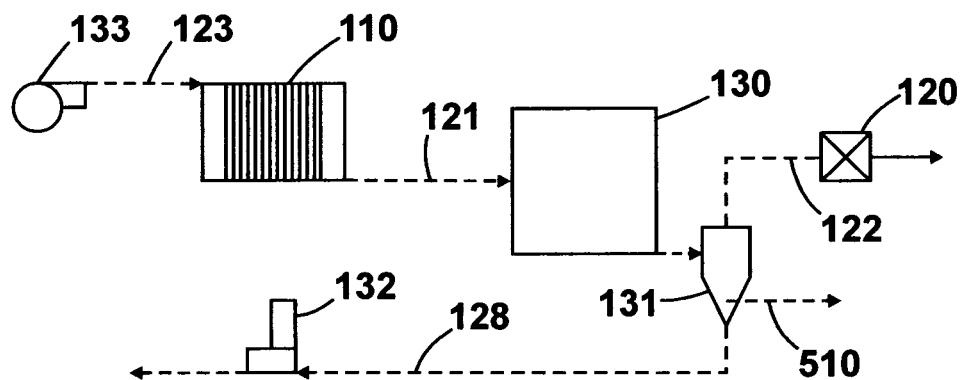

Two alternative arrangements of the cathode exit, exhaust and water ejection lines are shown schematically in FIGS. 5a and 5b. In FIG. 5a, the water separator 131 is connected first in line with the cathode exit line 121, in series with and before the heat exchanger 130, and two water ejection lines 128a, 128b are used to send water via pumps 132a, 132b to the containment vessel 140. In FIG. 5b, the water separator 131 is connected in series with, but after, the heat exchanger 130, and a single pump 132 is used to pump water through the water return line 128 to the containment vessel 140.

In the configuration of FIG. 5a, the cathode exit stream is passed through the cathode exit line 121 to a cyclonic water separator 131, which removes the liquid content before redirecting saturated air to a heat exchanger 130. The heat exchanger 130 cools the saturated air stream, which results in a proportion of the entrained water changing to liquid phase. Two pumps 132a, 132b are used to transfer recovered water to the containment vessel 140, one pump 132a connected via water return line 128a to the base of the separator 131 and the other 132b connected via water return line 128b to the heat exchanger 130 exit manifold box. During normal fuel cell operation the variable shut off valve 120 is held open. However, during fuel cell system shutdown, this valve is closed to back pressure the cathode flow path. In this case the compressor 133 (or other device which supplies air to the fuel cell according to a defined flow rate set point) works harder to maintain a fixed air flow rate. The separator 131 contains a pressure relief valve (not shown) which, during this back pressured shutdown phase, opens allowing ejection of water from the water separator 131 through a water purge line 510 (typically to atmosphere). Prior to back pressuring the cathode flow path at system shutdown, the pump 132a is typically allowed to run for a few seconds to clear most of the water from the separator 131.

In the configuration of FIG. 5b, operation is similar to that of FIG. 5a, except that the cyclonic separator 131 is positioned after the heat exchanger 130. As such, the liquid element of the cathode exit stream is passed through the heat exchanger 130. In addition, only one pump 132 is required to transfer the recovered water back to the containment vessel 140. One advantage of this configuration is that as the inlet to the heat exchanger 130 is part way from the bottom, any residual water that remains in the heat exchanger 130 after shutdown will fall to occupy the lower part of the heat exchanger 130. In the event of the heat exchanger 130 then being subjected to sub-zero temperature, this water will freeze. However, flow will still be possible through the cathode flow path through the rest of the heat exchanger, which will then heat up and defrost the frozen water in the lower part.

The purge port 510 in each case allows the cyclonic separator to be cleared dry, allowing subsequent storage at low temperatures.

Preferably, the thermal inertia of the cyclonic separator 131 is low such that when a small amount of liquid water enters the separator when the separator 131 is below 0° C., the liquid water does not freeze.

Optionally, a pressure relief valve may be used to increase the back pressure of the system to such an extent that the transfer pumps 132, 132a, 132b are not required. However, in this instance the cyclonic relief valve and purge port 510 might not be fitted, to ensure that the internal pressure in the cathode water exit line 121 forces water through the water ejection line towards the water containment vessel 140. If no transfer pump 132 is fitted, the arrangement shown in FIG. 5b is more preferable, to ensure that water ejected from the cathode exit line passes through a single water ejection line 128.

During operation of the fuel cell system 100 (with reference to FIGS. 1 and 2), water from the containment vessel 140 is pumped through the cathode flow path via the cathode water injection line 125 and the cathode water injection inlet 127. After passing through the cathode volume within the fuel cell stack 110, water passes out of the stack 110 via the cathode water exit line 121 and into the heat exchanger 130. A mixture of exhaust gas and condensed water passes through the water separator 131. Condensed water then passes through the water return line 128 and into the water containment vessel 140. Any excess water is ejected through the water overflow line 144. Exhaust gases are ejected through the exhaust shut-off valve 120, which is held at least partially open to control the pressure within the cathode flow path.

With reference to FIG. 1, fuel gas is fed into the anode inlet 156 and into the anode volume (not shown) within the fuel cell stack 110. Valves 153, 161 are operated to maintain a desired pressure within the anode volume. The manual valve 162 connected to the anode outlet 159 remains closed. Optionally, water ejected from the anode exhaust stream is separated into liquid and gas phases with a further water separator 163.

On shutdown of the fuel cell system 100, the fuel supply to the fuel cell stack 110 is first shut off by closing the solenoid actuated valve 153 on the fuel supply line 155. The shut-off valve 120 on the cathode exhaust line 122 is then closed, while the air compressor 133 continues operation. In practice a time may be required to flush through the cathode flow path with air before the shut-off valve 120 is closed. The pressure in the cathode flow path then rises. The water ejection line pump 132, if present, preferably continues operation for a time after the shut-off valve is closed, to allow water to continue passing through to the containment vessel 140. The containment vessel pump 230 ceases operation, and water consequently stops being fed into the cathode water injection line 125.

A short purging operation of the anode flow path may also be used during shutdown to eject water present in the anode flow path, with water being forced through opened anode exit valve 161, followed by depressurisation of the anode volume in the fuel cell stack 110.

Air being flushed through the cathode flow path forces residual water out of the cathode volume in the fuel cell stack 110 and through the cathode exit line 121, through the heat exchanger 130 to the water separator 131. The pump 132 pumps water from the separator 131 through the water return line 128 and into the water containment vessel 140. When the shut-off valve 120 closes the cathode air pressure will rise, forcing water out of the cathode volume in the fuel cell stack 110 through the cathode water injection inlet 127 and through the cathode water injection line 125 and the purge port 238 of the reverse flow relief valve 213 towards the water containment vessel 140.

The ability to purge water from the cathode flow path through to the water containment vessel 140 allows water, which may be trapped in internal features and water distribution galleries, to be removed. For a typical size of fuel cell stack for automotive applications, this may result in around 30 ml of water being removed from the cathode flow path. The use of the air compressor 133 rather than a nitrogen purge feed reduces the number of components required and avoids excessive drying out of the fuel cell stack. The membranes in the stack can then be kept in a more suitable state for a subsequent start-up operation. Timed operation of the air compressor on shutdown can be optimized to provide a balance between removing sufficient water to prevent adverse effects from sub-zero conditions and dehydration of the membranes. For a typical fuel cell system, the air compressor may be operated around 1 to 2 minutes after closing the exhaust valve 120. Hydrogen gas may also be used to purge excess water from the anode flow path.

While the method and agent have been described in terms of what are presently considered to be the most practical and preferred implementations, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes an and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the implementation, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting, such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternatives.

Further, the use of the transitional phrase "comprising" is used to maintain the "open-end" claims herein according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

All callouts associated with figures are hereby incorporated by this reference.

Since certain changes may be made in the above apparatus without departing from the scope of the invention herein involved, it is intended that all matter contained in the above description, as shown in the accompanying drawing, shall be interpreted in an illustrative, and not a limiting sense.

The invention claimed is:

1. A fuel cell system comprising a reverse flow relief valve comprising: a first feed port; a second feed port; a non-return valve within a main fluid passage extending between the first and second feed ports, the non-return valve configured to allow fluid to pass from the first to the second feed ports and to block passage of fluid in the reverse direction; a bypass fluid passage in fluid communication with the main fluid passage; and a sealing valve biased against an end of the bypass passage between the bypass passage and a purge port, wherein the sealing valve is configured to maintain a seal against the bypass passage when fluid pressure in the first feed port exceeds fluid pressure at the second feed port to prevent fluid flow from the main fluid passage to the purge port through the bypass fluid passage, and to allow fluid flow from the second feed port to the purge port through the bypass fluid passage when fluid pressure at the second feed port exceeds fluid pressure at the first feed port, wherein the second feed port of the reverse flow relief valve is connected to a cathode water injection line, the first feed port is connected to a pump and the purge port is in fluid communication with an interior volume of a water containment vessel.

2. The reverse flow relief valve of claim 1 wherein the sealing valve is configured to allow fluid flow from the second feed port to the purge port through the bypass fluid passage when fluid pressure at the second feed port exceeds fluid pressure at the first feed port by a predetermined amount.

3. The reverse flow relief valve of claim 2 wherein the predetermined amount is no less than 300 mbar.

4. The reverse flow relief valve of claim 1 wherein an opposing face of the diaphragm is in fluid communication with the first feed port.

5. The reverse flow relief valve of claim 1 comprising a connecting fluid passage extending between the first feed port and the sealing valve.

* * * * *

UNITED STATES PATENT AND TRADEMARK OFFICE
CERTIFICATE OF CORRECTION

PATENT NO. : 8,557,454 B2  Page 1 of 1
APPLICATION NO. : 12/680511
DATED : October 15, 2013
INVENTOR(S) : Adcock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this
Fifteenth Day of September, 2015

Michelle K. Lee
*Director of the United States Patent and Trademark Office*